(12) United States Patent
Caswell

(10) Patent No.: US 7,540,441 B2
(45) Date of Patent: Jun. 2, 2009

(54) ANTI-BACKLASH DEVICE

(76) Inventor: Jaclyn Caswell, 57 Beech St., Homosassa, FL (US) 34445

( * ) Notice: Subject to any disclaimer, the term of this patent is extended or adjusted under 35 U.S.C. 154(b) by 0 days.

(21) Appl. No.: 11/963,818

(22) Filed: Dec. 22, 2007

(65) Prior Publication Data

US 2008/0149751 A1   Jun. 26, 2008

Related U.S. Application Data

(60) Provisional application No. 60/871,830, filed on Dec. 24, 2006.

(51) Int. Cl.
*A01K 89/02* (2006.01)
*B65H 23/08* (2006.01)

(52) U.S. Cl. .................... 242/286; 242/422.5

(58) Field of Classification Search ............ 242/286, 242/287, 422, 422.4, 422.5, 422.6, 422.7, 242/422.8

See application file for complete search history.

(56) References Cited

U.S. PATENT DOCUMENTS

| 983,013 | A | * | 1/1911 | Wright | 242/276 |
|---|---|---|---|---|---|
| 1,544,671 | A | * | 7/1925 | Maury | 242/287 |
| 1,554,133 | A | * | 9/1925 | Schmid | 242/287 |
| 2,059,519 | A | * | 11/1936 | Harris | 242/287 |
| 2,262,462 | A | | 5/1941 | Margis, Jr. | |
| 2,326,645 | A | | 8/1943 | Hill | |
| 2,713,978 | A | * | 7/1955 | Daniel | 242/287 |
| 2,715,503 | A | * | 8/1955 | Wegner, Sr. | 242/287 |
| 3,319,903 | A | * | 5/1967 | Mosier | 242/287 |
| 4,117,990 | A | * | 10/1978 | Denny | 242/287 |
| 4,142,694 | A | | 3/1979 | Rankin, Jr. | |
| 4,470,554 | A | * | 9/1984 | Kobayashi et al. | 242/245 |
| 4,520,971 | A | * | 6/1985 | Nagata | 242/258 |
| 4,674,699 | A | | 6/1987 | Fukushima et al. | |
| 5,289,992 | A | * | 3/1994 | Du Plessis et al. | 242/287 |
| 5,865,388 | A | * | 2/1999 | Yeh | 242/292 |
| 6,109,555 | A | | 8/2000 | Svenson et al. | |
| 6,206,311 | B1 | | 3/2001 | Kim et al. | |
| 6,364,231 | B1 | | 4/2002 | Hirayama et al. | |
| 6,732,965 | B2 | * | 5/2004 | Bascue, Jr. | 242/304 |
| 2006/0175449 | A1 | | 8/2006 | Hyun | |

FOREIGN PATENT DOCUMENTS

GB   1126158   9/1968

* cited by examiner

*Primary Examiner*—William A Rivera
(74) *Attorney, Agent, or Firm*—Christopher Wood; Wood & Eisenberg, PLLC

(57) ABSTRACT

An anti-backlash device for a fishing rod includes a retaining member mounted on the fishing rod. The retaining member has a slot for receiving a pointed tip portion of the anti-backlash device, to secure the anti-backlash device to the fishing rod. The slot in the retaining member receives the pointed tip portion of the anti-backlash device, so that the tip portion can be retained in the slot. In use, the anti-backlash device applies a retarding effect on a spool of a reel mounted on a fishing rod by application of pressure, preventing backlash and preventing knots and tangles of a fishing line. The anti-backlash device is sufficiently resilient and flexible so that it is disposed in tension against the reel sufficiently strongly to prevent knots and tangles but not so strongly as to prevent rotation of the reel during use thereof.

8 Claims, 7 Drawing Sheets

ANTI-BACKLASH DEVICE

CROSS REFERENCE TO RELATED APPLICATIONS

This application claims the benefit of priority from U.S. Provisional Patent Application Ser. No. 60/871,830, filed Dec. 24, 2006.

STATEMENT REGARDING FEDERALLY SPONSORED RESEARCH OR DEVELOPMENT

Not applicable.

FIELD OF THE INVENTION

The present invention relates generally to anti-backlash devices for preventing backlash when paying out a line from a spool.

BACKGROUND OF THE INVENTION

It is known in the fishing equipment arts to employ various kinds of mechanical devices of varying complexity and cost of manufacture to cause braking of a fishing reel spool when slack occurs in a fishing line running from a spool, in order to prevent backlash. These devices offer varying levels of success in reducing backlash but are often expensive to buy and sometimes difficult to use.

It is accordingly a problem in the prior art to provide a device to cause braking of a fishing reel spool when slack occurs in a fishing line running from a spool, in order to prevent backlash, and which is relatively inexpensive and relatively easy to use.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a device to cause braking of a fishing reel spool when slack occurs in a fishing line running from a spool, in order to prevent backlash. Further, the device is relatively inexpensive and relatively easy to use.

The device according to the present invention includes an anti-backlash device having a pointed tip portion, a curved main body portion, and a broad end portion.

Other objects and advantages of the present invention will be more readily apparent from the following detailed description when read in conjunction with the accompanying drawings.

DETAILED DESCRIPTION OF THE INVENTION

This invention is directed to an anti-backlash device 100 for preventing backlash when paying out a line from a spool. The anti-backlash device 100 is shown in perspective view in FIG. 1, having a pointed tip portion 120, a curved main body portion 140, and a broad end portion 160. The anti-backlash device 100 can be composed of plastic, metal, wood, or rubber. In use, the anti-backlash device 100 of FIG. 1 applies a retarding effect on a spool or a reel by application of pressure thereto, thereby preventing knots and tangles of a fishing line, the spool and fishing line being described below with regard to FIGS. 2-6. The anti-backlash device 100 is preferably sufficiently resilient and flexible so that it can be disposed in tension against the reel R which is sufficient to prevent knots and tangles but not so strong as to prevent rotation of the reel R during use thereof.

Figure 1:
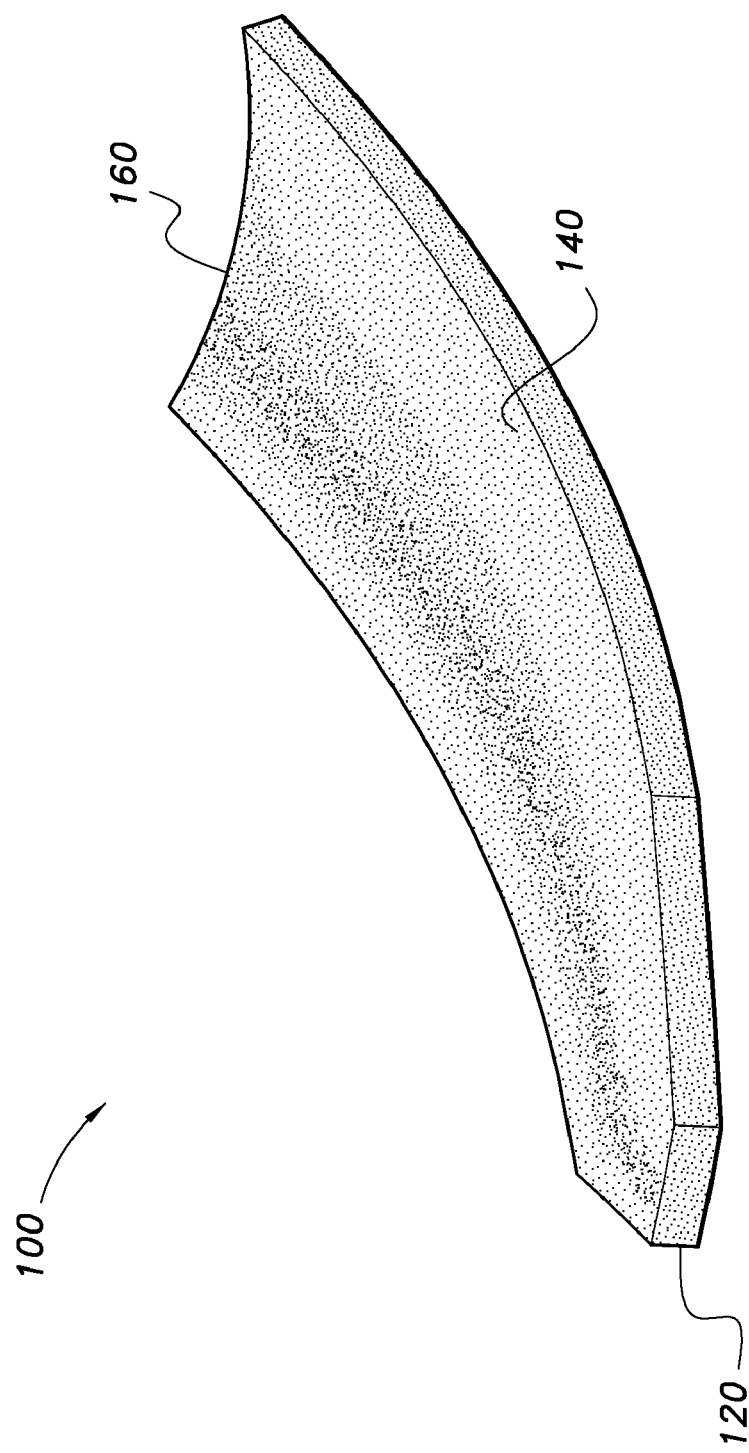
FIG. 1 is a perspective view of an anti-backlash device according to the present invention.
Figure 2:
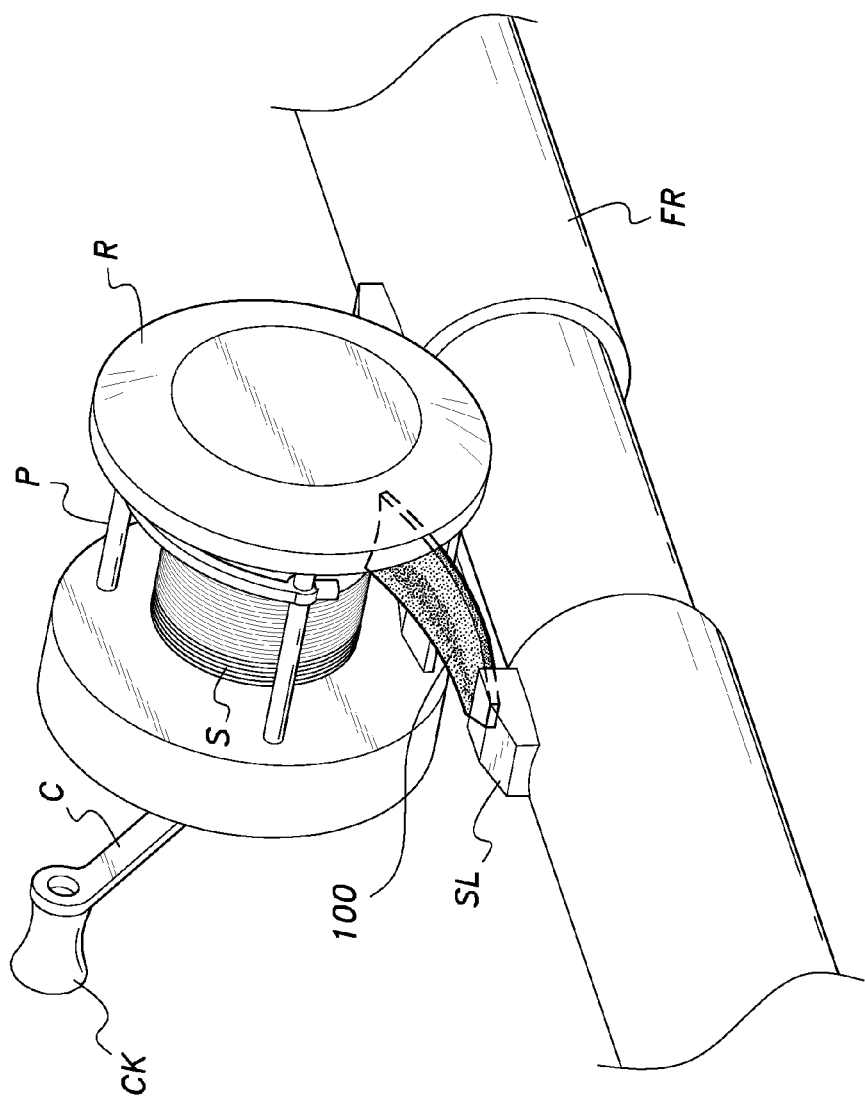
FIG. 2 is a perspective view of the anti-backlash device of FIG. 1 in use on a reel and rod.

FIG. 2 is a perspective view of the anti-backlash device 100 shown in FIG. 1, in use with a reel R and a fishing rod FR. The fishing rod FR carries a retaining member SL having a slot for receiving the pointed tip portion 120 of the anti-backlash device 100 in the manner shown in FIG. 2. The retaining member SL can be formed of any material strong enough to secure the anti-backlash device 100 to the fishing rod FR, such materials generally including plastic, metal, rubber, and wood. The retaining member SL can be secured to the fishing rod FR by any known fastening means, such as a threaded fastener, an adhesive, a slot-and-groove joint, nails, and any other fastening means known to anyone having skill in the fastening arts. The slot in the retaining member SL preferably receives the pointed tip portion 120 in a snug fit, though the slot in the retaining member SL can also be somewhat larger than the pointed tip portion 120. The pointed tip portion 120 can be retained in the slot in the retaining member SL by frictional engagement, or it can alternatively be retained therein by adhesive, by nailing, or by a more complex arrangement such as a tang and catch of the type used to retain communication cables in computers. All such retention means are contemplated as being within the scope of the present invention.

The fishing rod FR shown in FIG. 2 can be any type of known fishing rod. The reel R in FIG. 2 has a spool S, a spool flange SF, a plurality of pillars P, a crank C, and a crank knob CK. The spool S of the reel R carries a wound fishing line L which extends in a known manner along the fishing rod FR so that a free end of the fishing line L, carrying a hook and/or sinker, can be cast or dropped into water for fishing.

While a particular type of fishing rod FR and a particular type of reel R are shown in FIG. 2, the anti-backlash device 100 of the present invention can be used with nearly any conventional type of fishing rod or reel.

Figure 3:
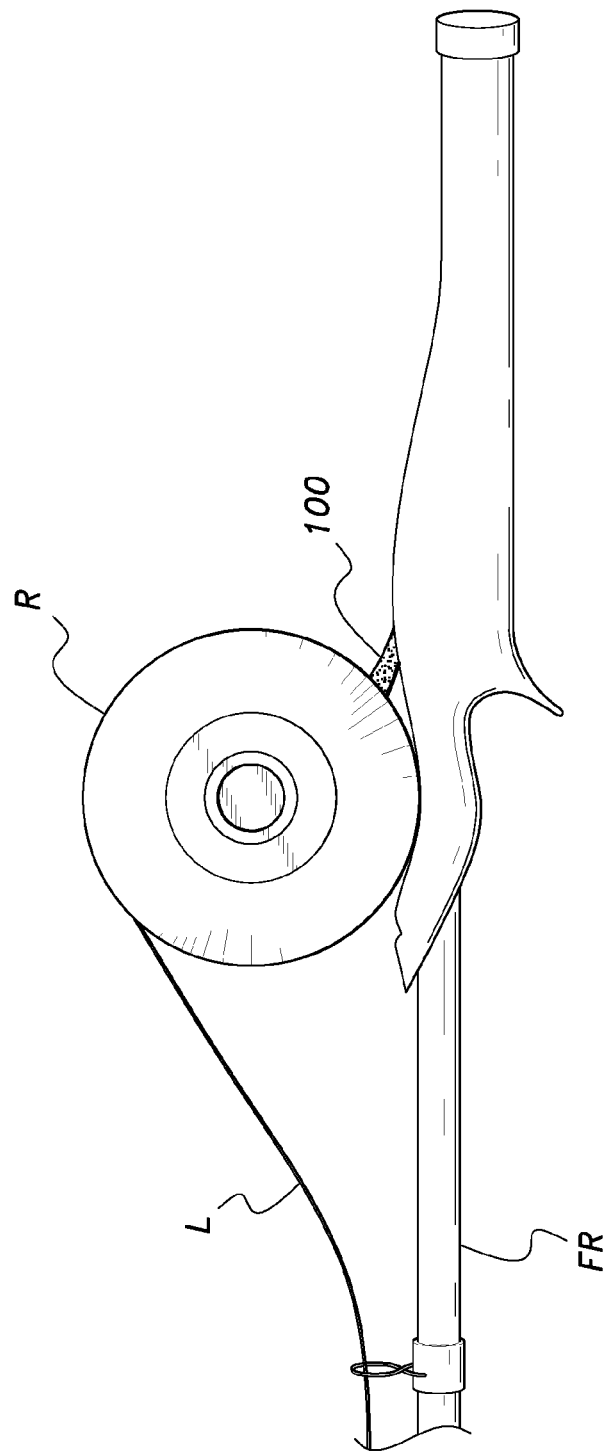
FIG. 3 is a schematic side elevational view of the anti-backlash device of FIGS. 1 and 2 installed on a rod and reel of FIG. 2, as viewed from the left side of FIG. 2.

FIG. 3 is a schematic side elevational view of the anti-backlash device 100 of FIGS. 1 and 2 as installed on the fishing rod FR and the reel R of FIG. 2, as viewed from the left side of FIG. 2.

Figure 4:
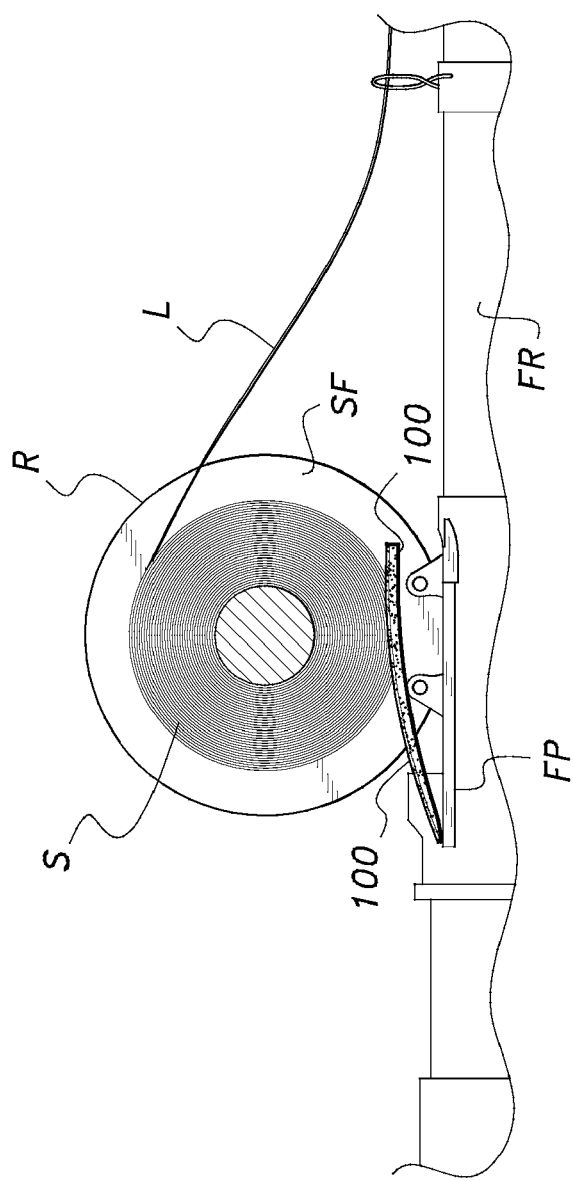
FIG. 4 is a schematic side elevational view of the anti-backlash device of FIGS. 1 and 2 installed on a rod and reel of FIG. 2, as viewed from the right side of FIG. 2.

FIG. 4 is a schematic side elevational view of the anti-backlash device 100 of FIGS. 1 and 2 installed on the fishing rod FR and the reel R of FIG. 2, as viewed from the right side of FIG. 2.

Figure 5:
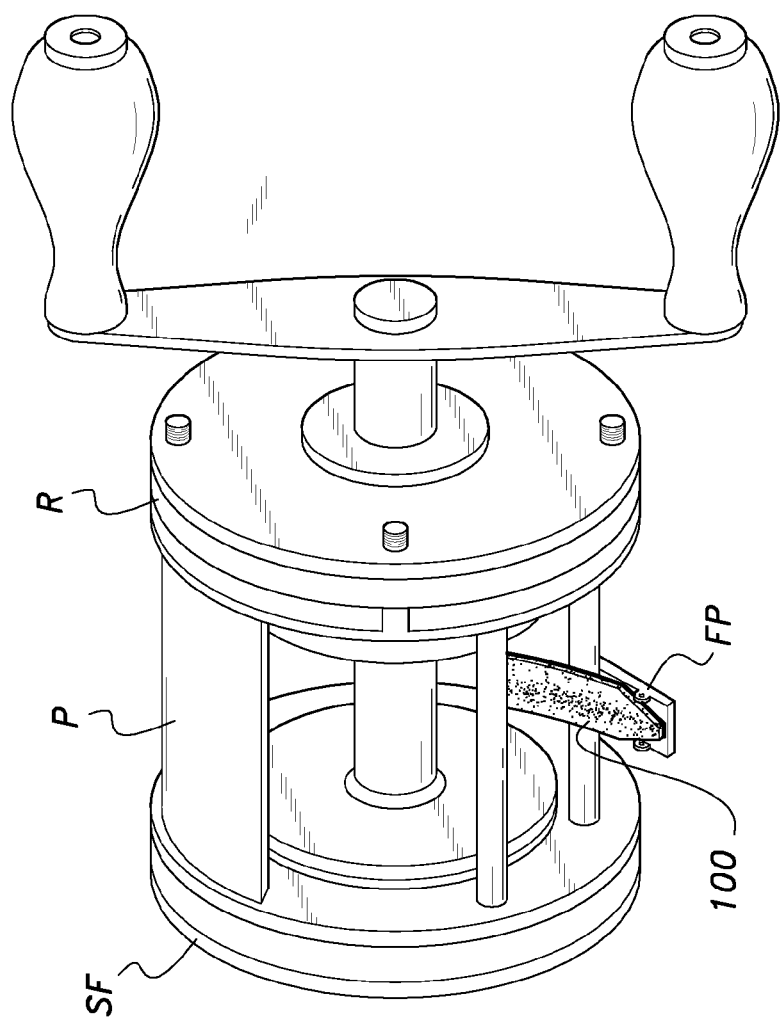
FIG. 5 is a perspective view of the anti-backlash device similar to that of FIG. 2, in use with another embodiment of reel.

FIG. 5 is perspective view of the anti-backlash device 100 similar to that of FIG. 2, in use with another embodiment of reel R.

Figure 6:
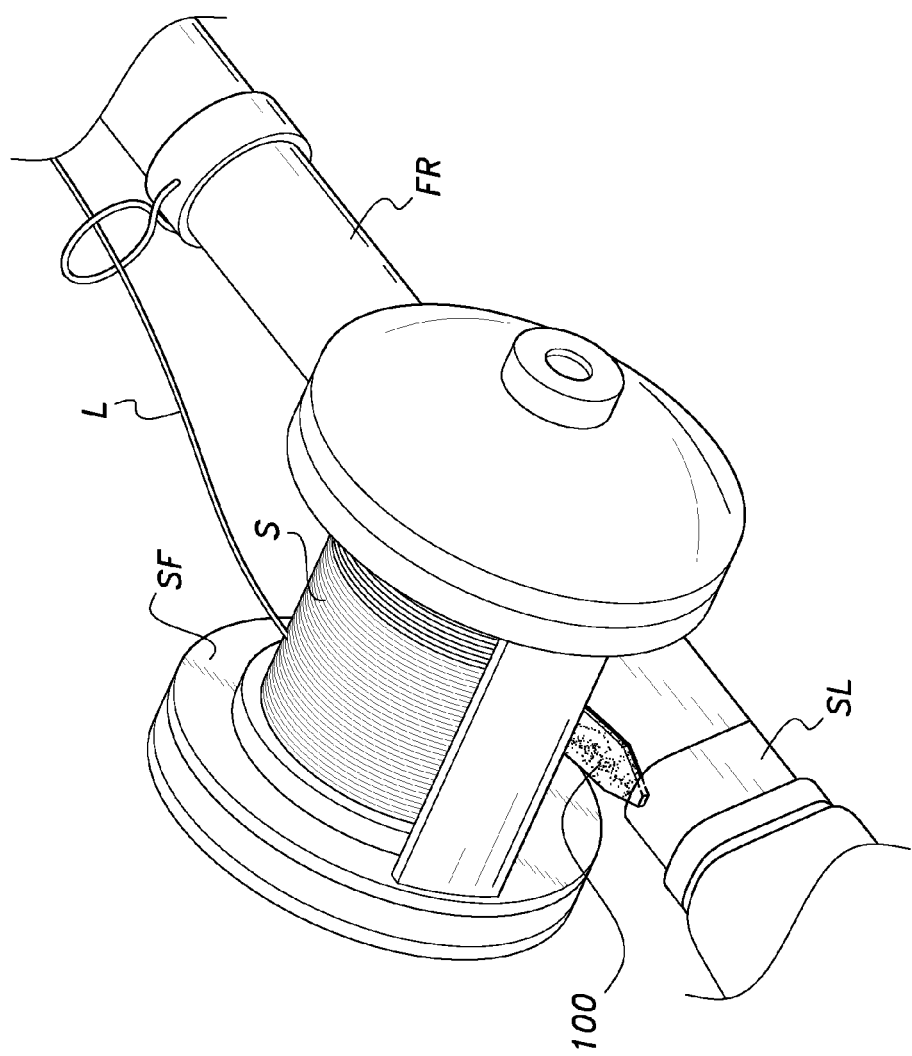
FIG. 6 is a perspective view of the anti-backlash device of FIG. 1 in use on another embodiment of a reel and rod.

FIG. 6 is a perspective view of the anti-backlash device 100 of FIG. 1 in use on another embodiment of a fishing rod FR and reel R.

Figure 7:
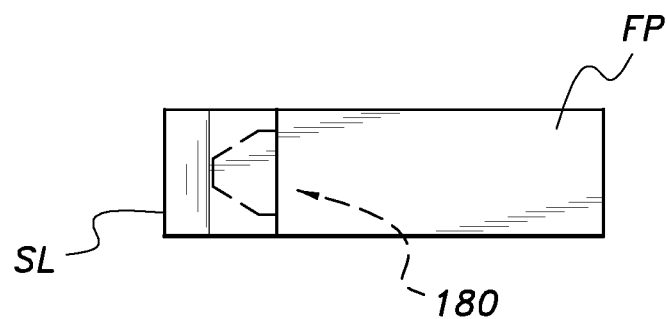
FIG. 7 is a schematic side elevational view of a retaining member and footplate.

FIG. 7 is a schematic side elevational view of the retaining member SL and the footplate FP. The retaining member SL has a groove 180 shown in dashed outline in this figure. Here, the retaining member SL and the footplate FP are shown together, and could have an integral construction such that the retaining member SL and footplate FP are together secured to the fishing rod FR by fastening the footplate FP to the fishing rod FR by threaded members such as screws or by adhesive. Alternatively, the retaining member SL and the footplate FP can be separate members which are separately secured to the fishing rod FR by fastening means such as threaded members, adhesive, nailing, slot-and-groove joints, or any other fastening means known to one having skill in the fastening arts.

Figure 8:
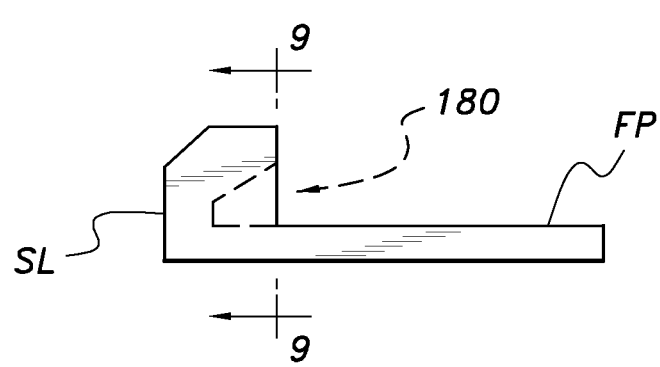
FIG. 8 is a schematic top elevational view of the retaining member and footplate of FIG. 7.

FIG. 8 is a schematic top elevational view of the retaining member SL and footplate of FIG. 7. The groove 180 is shown in dashed outline in FIG. 8.

Figure 9:
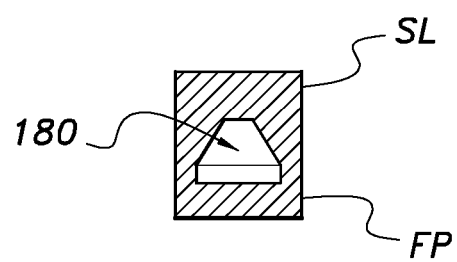
FIG. 9 is a schematic sectional view of the retaining member and footplate of FIG. 8 taken along line 9-9 of FIG. 8.

FIG. 9 is a schematic sectional view of the retaining member and footplate of FIG. 8 taken along line 9-9 of FIG. 8. The groove 180 can be clearly seen in FIG. 9.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. An anti-backlash arrangement for preventing backlash when paying out a fishing line from a spool of a reel, comprising:
    a retaining member having a slot in one end, the retaining member being adapted to be carried on a fishing rod having a reel;
    an anti-backlash device having a broad end portion, a body portion, and a pointed tip portion adapted to be received in the slot in the retaining member, the anti-backlash device being resiliently flexible and being adapted to be disposed between the retaining member and the reel such that the broad end portion contacts the fishing line on the spool so as to apply pressure to the reel;
    whereby the pressure applied by the anti-backlash device to the reel prevents formation of knots and tangles in fishing line carried on the reel.

2. An anti-backlash arrangement as claimed in claim 1, further comprising a footplate connected to the fishing rod such that the anti-backlash device is disposed between the footplate and the reel.

3. An anti-backlash arrangement as claimed in claim 2, wherein the footplate has an elongated flat body.

4. An anti-backlash arrangement as claimed in claim 1, further comprising a footplate connected to the retaining member, the footplate being fastened to the fishing rod such that the antibacklash device is disposed between the footplate and the reel.

5. An anti-backlash arrangement as claimed in claim 1, further comprising a footplate connected to the fishing rod such that the anti-backlash device is disposed between the footplate and the reel.

6. An anti-backlash arrangement in combination with a fishing rod and a reel having a spool with fishing line, for preventing backlash when paying out a line from the spool, comprising:
    a fishing rod;
    a reel having a spool with fishing line;
    a footplate connected to the fishing rod beneath the spool;
    a retaining member having a slot in one end, the retaining member being connected to the fishing rod adjacent to the footplate;
    an anti-backlash device having a broad end portion, a body portion, and a pointed tip portion adapted to be received in the slot in the retaining member, the anti-backlash device being resiliently flexible and being disposed between the retaining member and the reel such that the broad end portion of the anti-backlash device contacts the fishing line on the spool so as to apply pressure to the reel;
    whereby the pressure applied by the anti-backlash device to the reel prevents formation of knots and tangles in fishing line carried on the reel.

7. An anti-backlash arrangement as claimed in claim 6, wherein the retaining member is connected to the footplate, and the footplate is fastened to the fishing rod such that the anti-backlash device is disposed between the footplate and the reel.

8. An anti-backlash arrangement as claimed in claim 6, wherein the footplate has an elongated flat body.

* * * * *